United States Patent [19]

Blain et al.

[11] Patent Number: 5,053,153

[45] Date of Patent: Oct. 1, 1991

[54] DIISOCYANATE DERIVATIVES AS ASHLESS DISPERSANTS AND DETERGENTS AND LUBRICANT COMPOSITIONS CONTAINING SAME

[75] Inventors: David A. Blain, Mt. Laurel; Angeline B. Cardis, Florence; Jeffrey C. Trewella, Flemington, all of N.J.

[73] Assignee: Mobil Oil Corp., Fairfax, Va.

[21] Appl. No.: 447,728

[22] Filed: Dec. 8, 1989

[51] Int. Cl.$^5$ .......................................... C10M 133/16
[52] U.S. Cl. .......................... 252/51.5 R; 252/51.5 A
[58] Field of Search ...................... 252/51.5 A, 51.5 R

[56] References Cited

U.S. PATENT DOCUMENTS

| | | | |
|---|---|---|---|
| 3,844,965 | 10/1974 | Brown | 252/51.5 A |
| 4,438,022 | 3/1984 | Campbell | 252/51.5 A |
| 4,524,006 | 6/1985 | Sandel | 252/51.5 A |
| 4,897,087 | 1/1990 | Blaine | 44/71 |

Primary Examiner—Prince E. Willis
Assistant Examiner—Jerry D. Johnson
Attorney, Agent, or Firm—Alexander J. McKillop; Charles J. Speciale; Howard M. Flournoy

[57] ABSTRACT

Reaction products in which polyethers are connected to polyamines using diisocyanates have been found to be effective ashless dispersants and detergents for various oils of lubricating viscosity.

17 Claims, No Drawings

DIISOCYANATE DERIVATIVES AS ASHLESS DISPERSANTS AND DETERGENTS AND LUBRICANT COMPOSITIONS CONTAINING SAME

CROSS-REFERENCE TO RELATED APPLICATIONS

This application is related to copending application Ser. No. 277,738, filed Nov. 30, 1988, entitled DIISOCYANATE DERIVATIVES AS ASHLESS FUEL DISPERSANTS AND DETERGENTS AND FUEL COMPOSITIONS CONTAINING SAME now U.S. Pat. No. 4,897,087.

BACKGROUND OF THE INVENTION

The present invention is directed to additive products and to their use in lubricants as a means of cleaning and/or retarding the formation of deleterious deposits on moving parts of, for example, internal combustion engines. More particularly, the invention is directed to lubricants compositions comprising reaction products in which polyethers are connected to polyamines via diisocyanates.

With the ever increasing demand for high performance engines to operate over long periods of time, it is necessary that the moving parts of such engines be maintained in as clean a state as possible. Both to prolong the life of the engine and to prolong the life of the vehicle which it propels as well as to reduce down time and repair of said vehicle. Just to merely maintain satisfactory performance, the moving parts of the engine must not be fouled up or dirty.

Additives are an important means of providing this protection for internal combustion and other similar type engines. As is well known, they may give lubricant compositions new properties or they may enhance properties already present. Nevertheless, the art is constantly seeking new materials to enhance the performance capabilities of these engines.

Products containing both polyether (also known as polyoxyalkylene) and polyamine fragments are known as fuel disperants as disclosed in U.S. Pat. Nos. 4,234,321 and 4,261,704.

U.S. Pat. No. 4,234,321 is directed to additive products produced by reacting certain hydrocarbyl(polyoxyalkylene) alcohols with phosgene and certain polyamines to produce hydrocarbyl polyoxyalkylene ureylene carbamates.

U.S. Pat. No. 4,261,704 is directed to polyoxyalkylene polyamines prepared by first reacting a polyoxyalkylene polyol or a polyoxyalkylene glycol monoether with a halogen-containing compound. The resulting halogenated ether is then aminated by reaction with a mono- or polyamine. The resulting products are substantialy monoamine or polyamine derivatives useful as intermediates for preparing cationic surfactants, cationic polymers and also as fuel detergent additives. The dispersants disclosed by these patents are not made using diiosocyanates which is a critical aspect of the present invention.

U.S. Pat. No. 4,696,755 is directed to lubricating oils containing an additive comprising hydroxy polyether amines. U.S. Pat. No. 4,699,724 is directed to additives prepared by coupling two mono-alkenyl succinimides with an aldehyde and a phenol. The above additives may be prepared in a variety of ways. None of these ways uses diisocyanates, however.

U.S. Pat. No. 3,844,965 discloses diisocyanate bridged polyether-polyamines as lubricant dispersants. The above patent mentions $C_{30}$ to $C_{200}$ hydrocarbyl substituted amines whereas the polyamines in our work are described as $C_6$ to $C_{30}$ hydrocarbyl substituted and non-hydrocarbylsubstituted amines.

Using these specific materials as lubricant additives is believed to be novel.

It is accordingly, very desirable for lubricants compositions to have multifunctional detergent/dispersancy additives which effectively control the buildup of deleterious materials in internal combustion engines.

SUMMARY OF THE INVENTION

The present invention provides a novel use of certain additive products of reaction as ashless detergents and dispersants for lubricants. The products are prepared by reacting a suitable diisocyanate with a polyether and then (usually catalytically) reacting the resultant intermediate product with a suitable polyamine to obtain the desired final product. More particularly, this invention is directed to compositions containing a major amount of an oil of lubricating viscosity or grease prepared therefrom and a minor amount of an additive product comprising a polyether connected to a polyamine via a diisocyanate. These additives impart detergency and dispersancy characteristics to lubricant compositions.

DESCRIPTION OF SPECIFIC EMBODIMENTS

The general procedure of preparing these additive products of reaction is as follows: $C_1$-$C_{60}$ alkyl, aryl, alkaryl, or arylalkyl diisocyanates are first reacted with polyethers in a refluxing inert hydrocarbon solvent. Polyethers can be made from lower olefin oxides such as ethylene, propylene, or butylene oxides with butylene oxide being preferred. The polyether can be mono-capped or not capped. A catalyst, such as triethylamine or diazabicyclooctane, may be used in the reaction. Although any suitable catalyst known in the art may be used. This intermediate product is added at room temperature to a polyamine dissolved in an inert hydrocarbon solvent. Any suitable inert hydrocarbon solvent may be used. However, toluene or a similar hydrocarbon solvent is preferred. The overall reaction is as generally shown below:

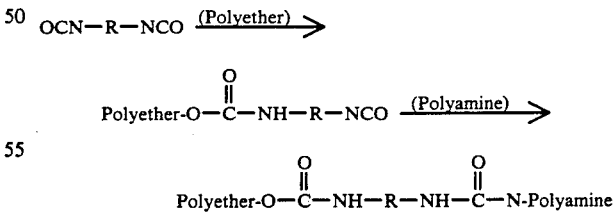

Where R is an alkyl, aryl, alkaryl, or arylalkyl group from about 1 to about 60 carbon atoms.

The polyamine portion of the molecule can contain any primary or secondary amine and combinations thereof. For example, diethylene triamine, triethylene tetramine, tetraethylene pentamine, pentaethylene hexamine, and their corresponding propylene amines, for example, dipropylene triamine, tripropylene tetramaine, tetrapropylene pentamine, and pentapropylene hexamine. These polyamines can be hydrocarbyl-substituted, preferably by $C_6$ to $C_{30}$ aryl or alkaryl groups attached via a Mannich reaction.

Other suitable amines include but are not limted to triamines such as N-oleyl diethylenetriamine, N-soya diethylenetriamine, N-coco diethylene triamine, N-tallow diethylenetriamine, N-decyldiethylenetriamine, N-dodecyl diethylenetriamine, N-tetradecyl diethylenetriamine, N-octadecyl diethylenetriamine, N-eicosyl diethylenetriamine, N-triacontyl diethylenetriamine, N-oleyl dipropylenetriamine, N-soya dipropylenetriamine, N-coco dipropylenetriamine, N-tallow dipropylenetriamine, N-decyl dipropylene triamine, N-dodecyl dipropylenetriamine, N-tetradecyl dipropylenetriamine, N-octadecyl dipropylenetriamine, N-eicosyl dipropylenetriamine, N-triacontyl dipropylenetriamine, the corresponding N-$C_{10}$ to $C_{30}$ hydrocarbyl dibutylenetriamine members as well as the corresponding mixed members, as for example, the N-$C_{10}$ to $C_{30}$ hydrocarbyl dibutylenetriamine members as well as the corresponding mixed members, as for example, the N-$C_{10}$ to $C_{30}$ hydrocarbyl ethylenepropylenetriamine, N-$C_{10}$ to $C_{30}$ hydrocabyl ethylenebutylenetriamine and N-$C_{10}$ to $C_{30}$ hydrocarbyl propylenebutylenetriamine.

Some typical examples of suitable isocyanates include but are not limited to 2,4-tolylene diisocyanate, 4,4'-diphenyl diisocyanate, 4,4'-diphenyl methane diisocyanate, dianisidine diisocyanates, 1,5-naphthalene diisocyanate, 4,4'-diphenyl ether diisocyanate, p-phenylene diisocyanate, trimethylene diisocyanate, tetramethylene diisocyanate, tetramethylxylene diisocyanate, trimethylhexamethylene diisocyanate, hexamethylene diisocyanate, ethylene diisocyanate, cyclohexylene diisocyanates, nonamethylene diisocyanate, octadecamethylene diisocyanate, 2-(dimethylamino) pentylene diisocyanate, tetrachlorophenylene-1,4-diisocyanate, 3-heptene diisocyanate, transvinylene diisocyanate, and isophorone diisocyanate, preferred is isophorone diisocyanate.

The polyether is generally added to the diisocyanate in a 1:1 ratio. The adduct is added to the polyamine in a ratio of 1:1 to X:1, where X is the number of nitrogens on the polyamine. Generally speaking, the temperature of the overall reaction varies from ambient to reflux or from about 25° to 250° C. with ambient pressure or slightly higher, if desired, for periods up to 24 hours or more.

In preparing a lubricant composition the additive is added to the base lubricating oil stock in a concentration of between 0.1 and 10 percent by weight of the total composition. The lubricants preferably comprise liquid mineral oils or synthetic oils or mixtures thereof, but also may be a grease in which any of the aforementioned oils may be employed as a vehicle. In general, the mineral oils, both paraffinic, naphthenic and mixtures thereof, employed as a lubricating oil or as the grease vehicle, can be of any suitable lubricating viscosity range, as for example, from about 45 SSU at 100° F. to about 6000 SSU at 100° F., and preferably from about 50 to about 250 SSU at 210° F. These oils may have viscosity indexes ranging to 100 or higher. Viscosity indexes from about 70 to about 95 are preferred. The average molecular weights of these oils can range from about 250 to about 800.

Where the lubricant is employed as a grease, the lubricating oil is generally used in an amount sufficient to balance the total grease composition, after accounting for the desired quantity of the thickening agent, and other additive components included in the grease formulation. A wide variety of materials can be employed as thickening or gelling agents. These can include any of the conventional metal salts or soaps, such as calcium, or lithium stearates or hydroxystearates, which are dispersed in the lubricating vehicle in grease-forming quantities in an amount to impart to the resulting grease composition the desired consistency. Other thickening agents that can be employed in the grease formulation comprise the non-soap thickeners, such as surface-modified clays and silicas, aryl ureas, calcium complexes and similar materials. In general, grease thickeners can be employed which do not melt and dissolve when used at the required temperature within a particular environment; however, in all other respects, any material which is normally employed for thickening or gelling hydrocarbon fluids for forming grease can be used in preparing the aforementioned improved grease in accordance with the present invention.

In instances where synthetic oils, or synthetic oils employed as the vehicle for the grease, are desired in preference to mineral oils, or in preference to mixtures of mineral and synthetic oils, various synthetic oils may be utilized successfully. Typical synthetic oil vehicles include polyisobutylenes, polybutenes, polydecenes and other polyalphaolefins, hydrogenated polydecenes and other hydrogenated polaphaolefins, polypropylene glycol, polyethylene glycol, trimethylol propane esters, neopentyl and pentaerythritol esters, di(2-ethylhexyl) sebacate, di(2-ethylhexyl) adipate, dibutyl phthalate, fluorocarbons, silicate esters, silanes, esters of phosphorus-containing acids, liquid ureas, ferrocene derivatives, hydrogenated synthetic oils, chain-type polyphenyls, siloxanes and silicones (polysiloxanes) and alkyl-substituted diphenyl ethers typified by a butyl-substituted bis(p-phenoxy phenyl) ether, and phenoxy phenylethers.

It is to be understood that the grease compositions described herein can also contain other materials, e.g., corrosion inhibitors, extreme pressure agents, viscosity index improvers, antioxidants, antiwear agents and the like can be used. These include, but are not limited to, phenates, sulfonates, succinimides, zinc dialkyl or diaryl dithiophosphates, and the like.

The following examples are presented to illustrate specific embodiments of this invention and are not to be intepreted as limitations upon the scope thereof.

The additive of the invention to be effective and added base lube oils in amounts varying from about 0.01 to about 10% by weight based on the total weight of the compositions.

EXAMPLES

EXAMPLE 1

440.8 grams (2.0 mol.) of nonylphenol and 103.2 grams (1.0 mol.) diethylene triamine were charged to a 1 liter reactor equipped with an $N_2$ inlet, mechanical stirrer, thermometer, and Dean Stark trap. The mixture was heated to 70° C. under a blanket of $N_2$. A total of 63.0 grams (2.1 mol.) of paraformaldehyde was added in four equal portions over 90 minutes. The mixture was heated to 110° C. for two hours and about 24 milliliters water was collected in the Dean Stark trap. A further 12 milliliters of water were collected upon stripping the mixture under house vacuum at about 250–300 mmHg, at 110° C. for two hours. The resulting viscous material was purified by hot filtration through celite.

EXAMPLE 2

The procedure of Example 1 is followed to prepare the Mannich base with the following exception: tetraethylene pentamine is substituted for diethylene triamine.

EXAMPLE 3

13.3 grams (0.06 mol.) isophorone diisocyanate; 130.8 grams (0.06 mol.) mono-capped polybutylene oxide, 0.1 gram (0.001 mol.) diazabicyclooctane and 100 milliliters toluene were charged to a 500 milliliter reactor equipped with an $N_2$ inlet, mechanical stirrer, thermometer, and water-cooled condenser. The solution was refluxed for 24 hours. This product was transferred to an addition funnel and was added dropwise at room temperature to a reactor containing 5.7 gram (0.03 mol.) tetraethylene pentamine (TEPA) in 100 milliliters toluene. The reaction was stirred an additional 15 minutes at which time IR spectroscopy showed the isocyanate peak at 2250 cm$^{-1}$ to be gone. The product was stripped of solvent under reduced pressure and filtered through celite.

EXAMPLE 4

The procedure from Example 3 was followed with the following exception: the product from Example 2 was substituted for the TEPA.

EXAMPLE 5

The procedure from Example 3 was followed with the following exception: triethylene tetramine was substitued for the TEPA.

EXAMPLE 6

The procedure from Example 4 was followed with the following exception: 2200 MW mono-capped polypropylene oxide was substituted for the polybutylene oxide.

EXAMPLE 7

The procedure from Example 6 was followed with the following exception: twice the amount of the product from Example 2 was used.

EXAMPLE 8

The procedure from Example 3 was followed with the following exception: hexamethylene diisocyanate was substituted for the isophorone diisocyanate.

EXAMPLE 9

The procedure from Example 4 was followed with the following exception: hexamethylene diisocyanate was substituted for the isophorone diisocyanate.

EXAMPLE 10

The procedure from Example 3 was followed with the following exceptions: hexamethylene diisocyanate was substituted for the isophorone diisocyanate and the product from Example 1 was substituted for the TEPA.

EXAMPLE 11

The procedure from Example 3 was followed with the following exceptions: tetramethylxylene diisocyanate was substituted for the isophorone diisocyanate.

EXAMPLE 12

The procedure from Example 4 was followed with the following exceptions: tetramethylxylene diisocyanate was substituted for the isophorone diisocyanate.

EXAMPLE 13

The procedure from Example 10 was followed with the following exceptions: tetramethylxylene diisocyanate was substituted for the hexamethylene diisocyanate.

EXAMPLE 14

The procedure from Example 3 was followed with the following exceptions: trimethylhexamethylene diisocyanate was substituted for the isophorone diisocyanate and bis-(3-aminopropyl)piperazine was substituted for the TEPA.

EXAMPLE 15

The procedure from Example 14 was followed with the following exceptions: two equivalents of (3-aminopropyl)morpholine were substituted for the bis-(3-aminopropyl)piperazine.

EXAMPLE 16

The procedure from Example 3 was followed with the following exceptions: tolylene diisocyanate was substituted for the isophorone diisocyanate and 1040 MW polypropylene oxide was substituted for the polybutylene oxide.

EXAMPLE 17

The procedure from Example 16 was followed with the following exceptions: 2200 MW polypropylene oxide was substituted for the 1040 MW polypropylene oxide.

Evaluation of the Product

Example 4 was also evaluated by the B-10 Catalytic Oxidation Test.

B-10 Catalytic Oxidation Test

Basically, the test lubricant is subjected to a stream of air which is bubbled through at the rate of five liters per hour respectively at 325° F. for 40 hours or at 375° F. for 24 hours. Present in the composition are samples of metals commonly used in engine construction, namely, iron, copper, aluminum, and lead. See U.S. Pat. No. 3,682,980, incorporated herein by reference, for further details of the test.

TABLE

| | Catalytic Oxidation Test 24 Hours at 370° F. | | |
|---|---|---|---|
| Item | % Viscosity Change | Lead Loss (mg) | Sludge |
| Base Oil Fully (Formulated Marine Oil) | 72.9 | 0.6 | Light |
| Marine Oil Minus Dispersant Plus 4% Example 4 | 39.7 | 0.3 | Nil |

As shown above, the product in accordance with this invention shows dispersant and excellent antioxidant activity as evidenced by the control of viscosity change, lead loss and sludge.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. An improved detergent/dispersant/antioxidant lubricant composition comprising a major amount of an oil of lubricating viscosity or grease prepared therefrom and a minor detergency/dispersancy/antioxidant amount of a diisocyanate bridged polyether-polyamine product of reaction prepared by connecting polyethers to polyamines with diisocyanates as generally described below:

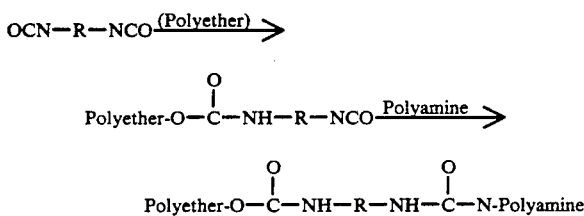

wherein R is from about 1 to about 60 carbon atoms, and is selected from the group consisting of alkyl, aryl, alkaryl, or arylalkyl and wherein the amine is substituted by a $C_6$ to $C_{30}$ aryl or alkaryl group attached via a Mannich reaction wherein the polyether is added to the diisocyanate in a 1:1 ratio and is made from epoxides selected from the group consisting of ethylene, propylene or butylene oxides or mixtures thereof, and the resultant adduct is added to the polyamine in a 1:1 to X:1 ratio and wherein X is the number of nitrogens on the polyamine and wherein the temperature of reaction varies from about 25°–250° C. at ambient pressures.

2. The composition of claim 1 wherein said lubricant is an oil of lubricating viscosity selected from the group consisting of (1) mineral oils, (2) synthetic oils, (3) mixtures thereof or (4) greases prepared from any one of (1), (2) or (3).

3. The composition of claim 2 wherein said oil is a mineral oil.

4. The composition of claim 3 wherein said lubricant is a grease.

5. The composition of claim 1 wherein the polyamine is selected from primary and second amines and mixtures thereof.

6. The composition of claim 5 wherein the polyamine is selected from the group consisting of diethylene triamine, triethylene tetramine, tetraethylene pentamine, pentaethylene hexamine, bis-(3- aminopropyl) piperazine and (3-aminopropyl) morpholine.

7. The composition of claim 5 wherein the polyamine is selected from the group consisting of propylene polyamines selected from the group consisting of dipropylene triamine, tripropylene tetramine, tetrapropylene pentamine and pentapropylene hexamine.

8. The lubricant composition of claim 6 wherein the polyamine is tetraethylene pentamine.

9. The lubricant composition of claim 6 wherein the polyamine is triethylene tetramine.

10. The composition of claim 1 wherein the dirsocyanate is selected from the group consisting of isophorone diisocyanate, hexamethylene diisocyanate, tetramethylxylene diisocyanate, and 2,4-tolylene diisocyanate.

11. The composition of claim 10 wherein the diisocyanate is isophorone diisocyanate.

12. The composition of claim 10 wherein the diisocyanate is tetramethylxylene diisocyanate.

13. The composition of claim 10 wherein the diisocyanate is hexamethylene diisocyanate.

14. The composition of claim 10 wherein the diisocyanate is 2,4-tolylene diisocyanate.

15. The composition of claim 1 wherein the epoxide is butylene oxide.

16. The composition of claim 1 wherein the epoxide is propylene oxide.

17. A method of preparing an improved detergent/dispersant/antioxidant lubricant composition comprising adding to an oil of lubricating viscosity or grease prepared therefrom from about 0.01% to about 10% by weight of a diisocyanate bridged polyether-polyamine product of reaction prepared by connecting polyether to polyamines with diisocyanates as described in claim 1.